United States Patent
Ying et al.

(10) Patent No.: US 10,919,505 B2
(45) Date of Patent: Feb. 16, 2021

(54) SYSTEMS AND METHODS FOR DYNAMICALLY DISTRIBUTING BRAKE TORQUE AMONG A PLURALITY OF BRAKES OF A VEHICLE

(71) Applicant: VEONEER-NISSIN BRAKE SYSTEMS JAPAN CO., LTD., Yokohama (JP)

(72) Inventors: Long Ying, Novi, MI (US); Huan Fu, Windsor (CA)

(73) Assignee: Veoneer-Nissin Brake Systems Japan Co., Ltd., Kanagawa (JP)

(*) Notice: Subject to any disclaimer, the term of this patent is extended or adjusted under 35 U.S.C. 154(b) by 384 days.

(21) Appl. No.: 15/941,265

(22) Filed: Mar. 30, 2018

(65) Prior Publication Data

US 2019/0299949 A1 Oct. 3, 2019

(51) Int. Cl.
*B60T 8/1766* (2006.01)
*B60T 8/171* (2006.01)
(Continued)

(52) U.S. Cl.
CPC ......... *B60T 8/1766* (2013.01); *B60T 7/042* (2013.01); *B60T 8/171* (2013.01); *B60T 8/172* (2013.01); *B60T 8/1761* (2013.01); *B60T 8/3205* (2013.01); *B60T 8/58* (2013.01); *B60T 2210/32* (2013.01); *B60T 2220/04* (2013.01)

(58) Field of Classification Search
CPC combination set(s) only.
See application file for complete search history.

(56) References Cited

U.S. PATENT DOCUMENTS 9,409,559 B2  8/2016  Ozsoylu et al.
9,656,638 B2  5/2017  Rydsmo et al.
(Continued)

FOREIGN PATENT DOCUMENTS

JP    H01-240352 A   9/1989
JP    2005-178709 A  7/2005
(Continued)

OTHER PUBLICATIONS

JP-2005178709-A translation (Year: 2005).*
(Continued)

*Primary Examiner* — Abby Y Lin
*Assistant Examiner* — Renee LaRose
(74) *Attorney, Agent, or Firm* — Carrier Blackman & Associates, P.C.; Joseph P. Carrier; Jeffrey T. Gedeon

(57) ABSTRACT

Systems and methods for dynamically distributing brake torque among a plurality of brakes of a vehicle are provided. In one example, a method includes detecting a braking distribution condition; calculating a weight distribution for the vehicle based on a longitudinal acceleration and a lateral acceleration associated with the vehicle to provide a calculated weight distribution; calculating a brake torque limit for each of the plurality of brakes based on the calculated weight distribution to provide calculated brake torque limits; calculating a target brake torque for each of the plurality of brakes based on a driver-demanded brake torque to provide target brake torques; and comparing the calculated brake torque limits with corresponding target brake torques.

16 Claims, 6 Drawing Sheets

(51) Int. Cl.
  *B60T 7/04*     (2006.01)
  *B60T 8/172*    (2006.01)
  *B60T 8/32*     (2006.01)
  *B60T 8/58*     (2006.01)
  *B60T 8/1761*   (2006.01)

(56) References Cited

U.S. PATENT DOCUMENTS

2010/0066163 A1* 3/2010 Imura ................. B60T 8/1766
                                                      303/146
2017/0008497 A1  1/2017 Svensson et al.
2017/0036651 A1  2/2017 Svensson et al.
2018/0118183 A1  5/2018 Spieker

FOREIGN PATENT DOCUMENTS

| JP | 2005178709 A | * | 7/2005 |
| JP | 2009-166620 A |   | 7/2009 |
| JP | 2010-12878 A |   | 1/2010 |
| JP | 2010012878 A | * | 1/2010 |
| JP | 2014-118065 A |   | 6/2014 |
| JP | 2014118065 A | * | 6/2014 |

OTHER PUBLICATIONS

JP-2010012878-A translation (Year: 2010).*
JP-2014118065-A translation (Year: 2014).*
International Search Report and Written Opinion issued in correlated Application No. PCT/IB2019/052553, dated Jul. 30, 2019.

* cited by examiner

SYSTEMS AND METHODS FOR DYNAMICALLY DISTRIBUTING BRAKE TORQUE AMONG A PLURALITY OF BRAKES OF A VEHICLE

FIELD

The present disclosure relates to braking systems for motor vehicles and, more particularly, to systems and methods for dynamically distributing brake torque among a plurality of brakes of a vehicle.

BACKGROUND

The statements in this section merely provide background information related to the present disclosure and may not constitute prior art.

Whenever vehicle deceleration changes, such as during the beginning of a vehicle braking event, weight distribution of the vehicle across individual wheels changes accordingly. The dynamics of the weight distribution change is a function of the vehicle characteristics, such as suspension design. Electrical brake force distribution (EBD) is reactive and, consequently, cannot predictively optimize brake force during the dynamics of the weight transfer. Accordingly, alternative or additional means of distributing brake force in a manner that accounts for changes in weight distribution of a vehicle are desired.

SUMMARY

In one aspect, the present disclosure relates to a method for dynamically distributing brake torque among a plurality of brakes of a vehicle. The method includes detecting a braking distribution condition. In response to detecting the braking distribution condition, a weight distribution for the vehicle is calculated based on a longitudinal acceleration and a lateral acceleration associated with the vehicle to provide a calculated weight distribution. A brake torque limit for each of the plurality of brakes is calculated based on the calculated weight distribution to provide calculated brake torque limits. A target brake torque is calculated for each of the plurality of brakes based on a driver-demanded brake torque to provide target brake torques. The calculated brake torque limits are compared with corresponding target brake torques. In response to determining that a target brake torque associated with a given brake exceeds a brake torque limit associated with the given brake, a brake toque applied to the given brake is adjusted to provide an adjusted brake torque. The adjusted brake torque is less than or equal to the brake torque limit associated with the given brake.

In an aspect, the method further includes measuring wheel speeds associated with each wheel of the vehicle to provide measured wheel speeds.

In another aspect, calculating the target brake torque for each of the plurality of brakes is further based on the measured wheel speeds.

In one aspect, the method further includes calculating an estimated vehicle speed based on the measured wheel speeds.

In yet another aspect, calculating the target brake torque for each of the plurality of brakes is further based on the estimated vehicle speed.

In an aspect, detecting a braking distribution condition includes detecting a braking event.

In one aspect, detecting a braking event is based on at least one of detecting movement of a brake pedal of the vehicle and/or detecting a presence of an object in the vehicle's path.

In yet another aspect, the method further includes detecting if an antilock braking system (ABS) of the vehicle is active.

In an aspect, the method further includes determining whether (i) the adjusted brake torque meets the driver-demanded brake torque and (ii) wheels of the vehicle maintain stability for a predetermined period of time in response to detecting that the ABS of the vehicle is not active.

In another aspect, the method further includes re-adjusting the brake torque applied to the given brake to provide a new adjusted brake torque in response to determining that either (i) the adjusted brake torque does not meet the driver-demanded brake torque or (ii) the wheels do not maintain stability for the predetermined period of time.

In an aspect, the present disclosure relates to a system for dynamically distributing brake torque among a plurality of brakes of a vehicle. The system includes a brake distribution detection module, a weight distribution calculation module, a brake torque limit calculation module, and a target brake torque calculation module. The brake distribution detection module is configured to detect a braking distribution condition. The weight distribution calculation module is configured to calculate a weight distribution for the vehicle based on a longitudinal acceleration and a lateral acceleration associated with the vehicle to provide a calculated weight distribution in response to detecting the braking distribution condition. The brake torque limit calculation module is configured to calculate a brake torque limit for each of the plurality of brakes based on the calculated weight distribution to provide calculated brake torque limits. The target brake torque calculation module configured to: (i) calculate a target brake torque for each of the plurality of brakes based on a driver-demanded brake torque to provide target brake torques; (ii) compare the calculated brake torque limits with corresponding target brake torques; and (iii) in response to determining that a target brake torque associated with a given brake exceeds a brake torque limit associated with the given brake, adjust a brake toque applied to the given brake to provide an adjusted brake torque, wherein the adjusted brake torque is less than or equal to the brake torque limit associated with the given brake.

In one aspect, the system further includes one or more wheel speed sensors configured to measure wheel speeds associated with each wheel of the vehicle to provide measured wheel speeds.

In yet another aspect, the target brake torque calculation module is further configured to calculate the target brake torque for each of the plurality of brakes based on the measured wheel speeds.

In an aspect, the system further includes an estimated vehicle speed calculation module configured to calculate an estimated vehicle speed based on the measured wheel speeds.

In one aspect, the target brake torque calculation module is further configured to calculate the target brake torque for each of the plurality of brakes based on the estimated vehicle speed.

In another aspect, the brake distribution detection module is configured to detect the braking distribution condition by detecting a braking event.

In an aspect, the brake distribution detection module is configured to detect the braking event by performing at least one of detecting movement of a brake pedal of the vehicle and/or detecting a presence of an object in the vehicle's path.

In one aspect, the system further includes an antilock braking system (ABS) detection module configured to detect if an ABS of the vehicle is active.

In yet another aspect, the target brake torque calculation module is further configured to determine whether (i) the adjusted brake torque meets the driver-demanded brake torque and (ii) wheels of the vehicle maintain stability for a predetermined period of time in response to the ABS detection module detecting that the ABS of the vehicle is not active.

In an aspect, the target brake torque calculation module is further configured to re-adjust the brake torque applied to the given brake to provide a new adjusted brake torque in response to determining that either (i) the adjusted brake torque does not meet the driver-demanded brake torque or (ii) the wheels do not maintain stability for the predetermined period of time.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Corresponding reference numerals indicate corresponding parts throughout the several views of the drawings.

DETAILED DESCRIPTION

Figure 1:
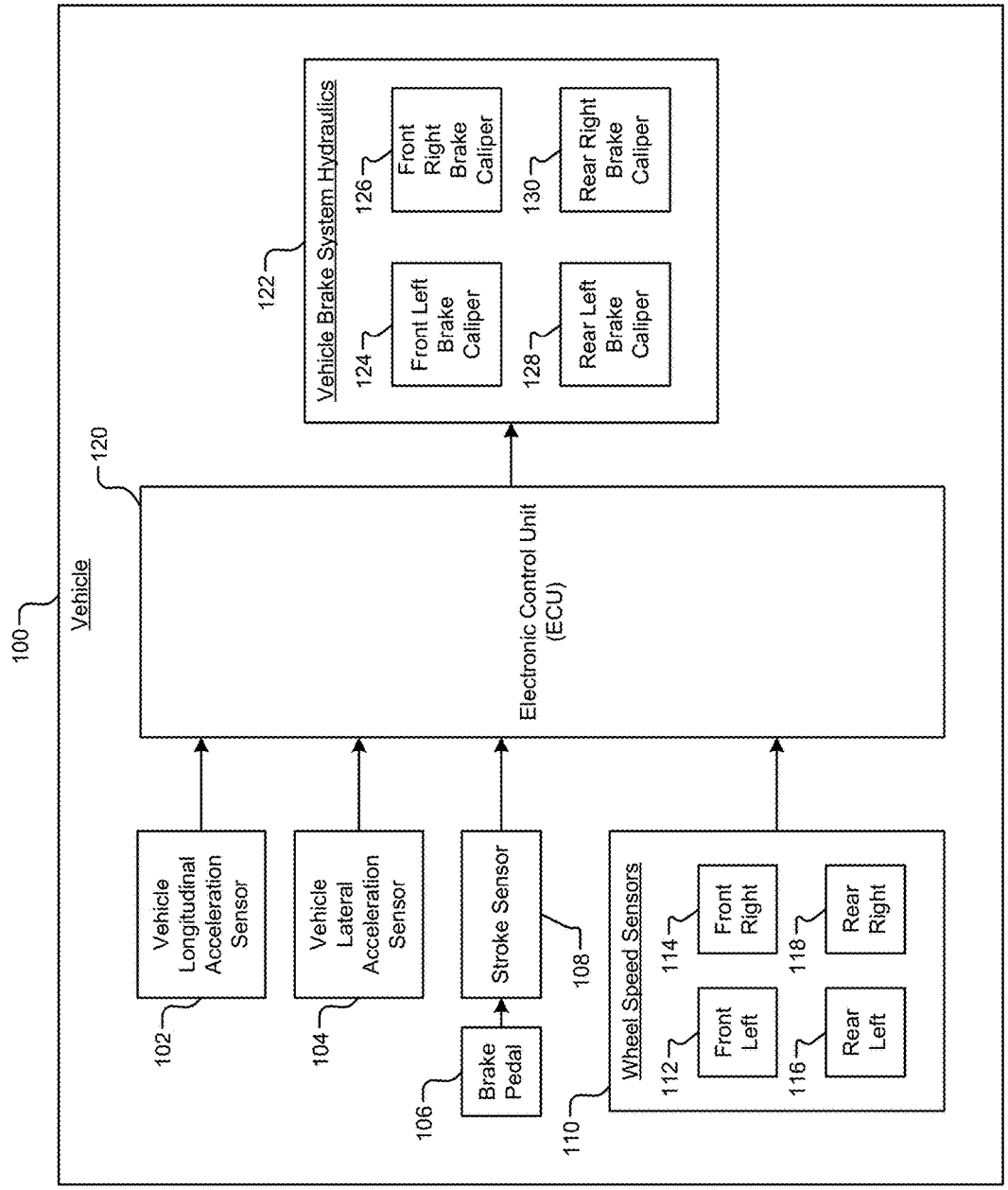
FIG. 1 is functional block diagram illustrating a vehicle including a system for dynamically distributing brake torque among a plurality of brakes in accordance with one example of the present disclosure.

The following description is merely exemplary in nature and is not intended to limit the present disclosure, application, or uses. It should be understood that throughout the drawings, corresponding reference numerals indicate like or corresponding parts and features.

Among other features, the present disclosure presents systems and methods for dynamically distributing brake torque among a plurality of brakes of a vehicle, also known as "Dynamic Brake Force Distribution" or "DBD." Generally, DBD involves calculating and distributing individual brake force (i.e., brake torque) in a vehicle equipped with an electronic brake control system, utilizing vehicle state data to detect situations requiring electronic braking distribution and control of the hydraulic brake pressure generation. The DBD system described herein distributes ideal brake force to the vehicle brakes to maximize traction by controlling hydraulic brake pressure at the vehicle wheels (i.e., in the brake calipers associated with respective vehicle wheels) dynamically throughout a braking event based on the vehicle situational data in coordination with the vehicle brake system control unit functions.

The present disclosure also provides a method for performing DBD. The method may involve maximizing traction throughout a braking event by dynamically adjusting brake pressures for the moment to moment changes in dynamic axle-load distribution based on vehicle state data to automatically achieve the ideal brake force. Asymmetric brake force between the front and rear of axles of the vehicle allows adjustable control of rear brake pressure to follow the optimal brake pressure curve for maximum stability throughout a braking event; while the front axle brake pressure can be separately controlled to react to the changing vehicle chassis weight distribution and speed of brake application and, when necessary, utilize feedforward pressure increases to trigger ABS and shorten the total stopping distance of the vehicle.

Figure 6A:
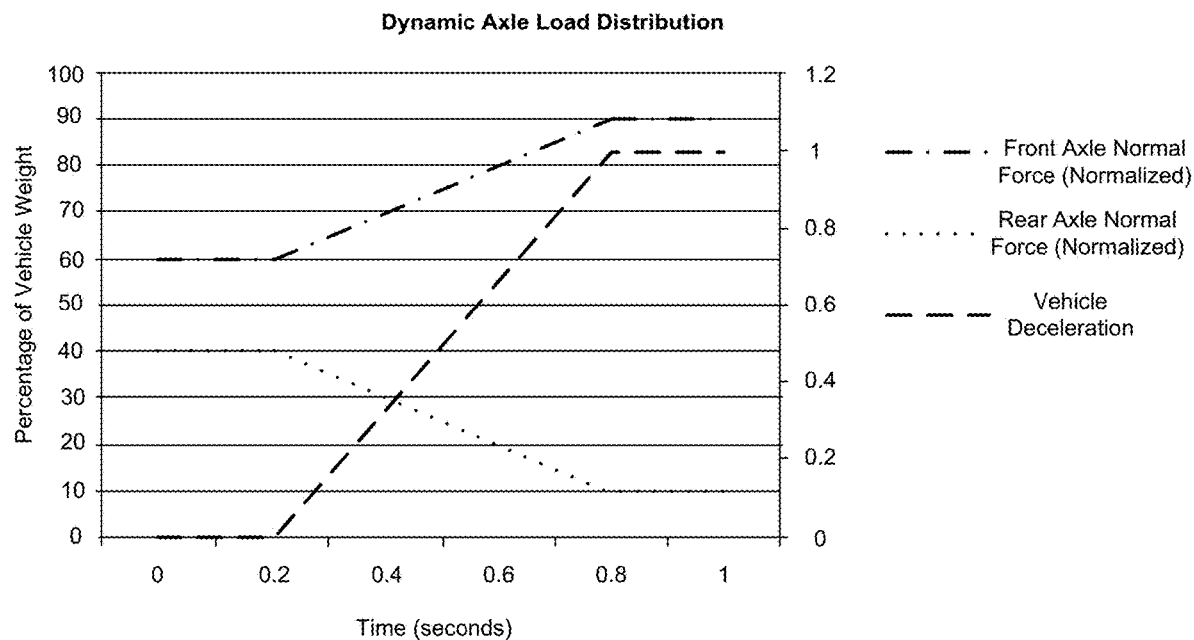
FIG. 6a is a chart illustrating dynamic axel load distribution for a vehicle over time in accordance with one example of the present disclosure.
Figure 6B:
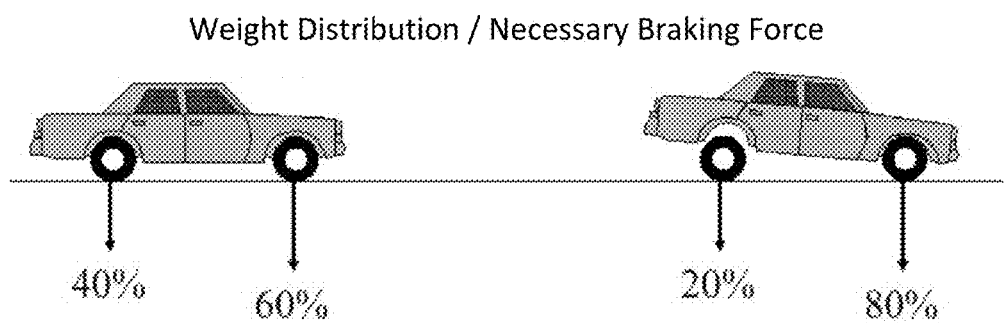
FIG. 6b is a schematic illustrating the weight distribution of a vehicle before and after a braking event in accordance with one example of the present disclosure.

During any braking event, straight forward travel, or while turning, vehicle deceleration will cause a shift of vehicle weight towards the front and/or one side of the vehicle. This concept is illustrated with regard to FIGS. 6a-6b. For example, as shown in FIGS. 6a-6b, a vehicle weight distribution may shift from a 60% front axle/40% rear axle distribution under non-braking operating conditions to upwards of a 80% front axle/20% rear axle weight distribution during vehicle deceleration. This shift in weight distribution may cause vehicle instability due to differing wheel slip rates. To alleviate instability, especially instability caused by rear wheel slip, some brake systems utilize vehicle state data to reduce the brake pressure of the rear wheels during a braking event. However, this approach may not optimize brake force distribution dynamically across all four wheels to account for the shift of vehicle weight throughout the braking event.

Accordingly, the DBD systems and methods of the present disclosure utilize vehicle state data, such as vehicle velocity, longitudinal acceleration, and lateral acceleration, to continuously calculate and dynamically adjust braking pressures (i.e., brake torques) individually. In this manner, DBD systems and methods of the present disclosure achieve and dynamically adjust for the ideal brake force distribution throughout the braking event, or until braking control is handed over to ABS.

Among other advantages, the systems and methods described herein provide improved performance in reducing vehicle stopping distance, smoother transitions into ABS from previous brake distribution methods, and reduced vehicle calibration effort due to automatic calculation of physical weight transfer in calculating brake force.

Referring now to FIG. 1, a vehicle 100 incorporating a system for dynamically distributing brake torque among a plurality of brakes is shown. The vehicle 100 includes a longitudinal acceleration sensor 102, a lateral acceleration sensor 104, a brake pedal 106, a stroke sensor 108, wheel speed sensors 110, an electronic control unit (ECU) 120, and vehicle brake system hydraulics 122. The wheel speed sensors 110 include a front left wheel speed sensor 112, a front right wheels speed sensor 114, a rear left wheel speed sensor 116, and a rear right wheel speed sensor 118. The vehicle brake system hydraulics 122 include a front left brake caliper 124, a front right brake caliper 126, a rear left brake caliper 128, and a rear right brake caliper 130.

In operation, the longitudinal acceleration sensor 102 is configured to measure a longitudinal acceleration of the vehicle 100. Similarly, the lateral acceleration sensor 104 is configured to measure a lateral acceleration of the vehicle 100.

The stroke sensor 108 is configured to sense a stroke (i.e., position) of the brake pedal 106. For example, the stroke sensor 108 may be used to detect whether an operator of the vehicle 100 has depressed the brake pedal 106, which may signify a braking event triggering execution of the methods for dynamically distributing brake torque among a plurality of brakes described herein.

The wheel speed sensors 110 are configured to measure wheel speeds associated with each wheel of the vehicle to provide measured wheel speeds. For example, the front left wheel speed sensor 112 is configured to measure the wheel speed associated with the front left wheel of the vehicle 100, the front right wheel speed sensor 114 is configured to measure the wheel speed associated with the front right wheel of the vehicle 100, etc. As described in additional detail below, the measured wheel speeds may be used, among other things, to calculate a brake torque limit for each brake of the vehicle 100, to calculate an estimated speed of the vehicle 100, etc.

The ECU 120 is configured to detect a braking distribution condition sufficient to trigger execution of the methods for dynamically distributing brake torque among a plurality of brakes described herein. In addition, the ECU 120 is configured to perform various calculations for determining the optimal brake torque to be applied to each brake of the vehicle 100, dynamically, as the weight distribution of the vehicle 100 changes as a result of, for example, the vehicle decelerating. Further still, the ECU 120 is configured to generate signals to the vehicle brake system hydraulics 122 configured to adjust the brake torque applied to the various brakes of the vehicle 100. The functionality of the ECU 120 is described in further detail with regard to FIG. 2 below.

Structurally, the ECU 120 (and/or the modules of the ECU 120 described with regard to FIG. 2 below) may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The vehicle brake system hydraulics 122 are configured to physically adjust the brake torque of the brakes of the vehicle 100. For example, the front left brake caliper 124 is configured to apply a brake torque to the front left wheel of the vehicle 100 in proportion to the hydraulic pressure applied to the caliper 124, the front right brake caliper 126 is configured to apply a brake torque to the front right wheel of the vehicle 100 in proportion to the hydraulic pressure applied to the caliper 126, etc.

Figure 2:
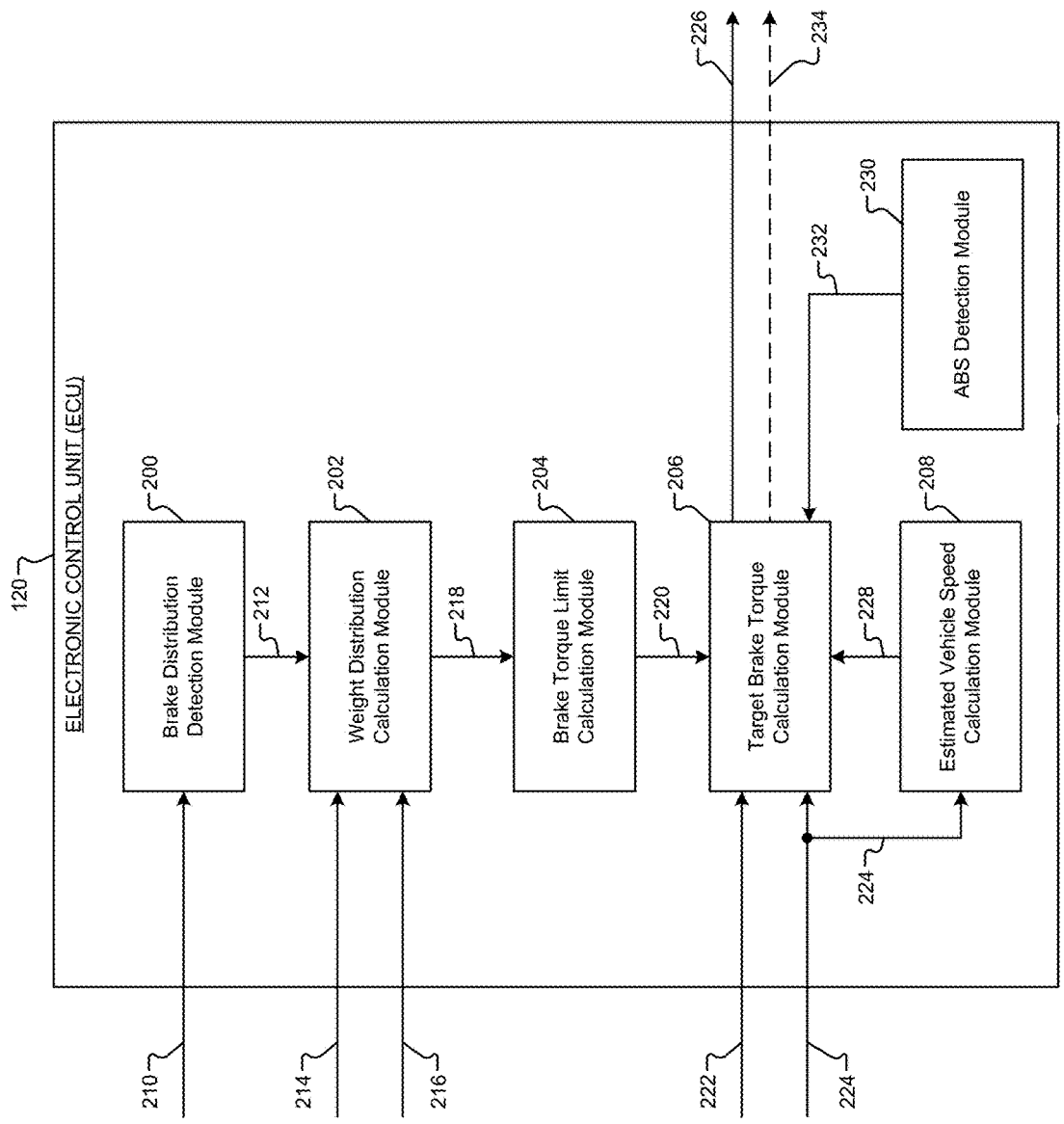
FIG. 2 is functional block diagram illustrating a more detailed view of the electronic control unit (ECU) of FIG. 1 in accordance with one example of the present disclosure.

Referring now to FIG. 2, a detailed view of the ECU 120 is shown. The ECU 120 includes a brake distribution detection module 200, a weight distribution calculation module 202, a brake torque limit calculation module 204, a target brake torque calculation module 206, an estimated vehicle speed calculation module 208, and an ABS detection module 230.

In operation, the ECU 120 may function as follows. The brake distribution detection module 200 is configured to detect a braking distribution condition and provide braking distribution condition data 212. In one example, the braking distribution detection module 200 is configured to detect the braking distribution condition by detecting a braking event, based on braking event data 210. In an example, the brake distribution detection module 200 is configured to detect the braking event based on detecting (i) movement of a brake pedal of the vehicle (e.g., movement of the brake pedal 106 by the stroke sensor 108) and/or (ii) a presence of an object in the vehicle's path. Whether or not an object is in the vehicle's path may be detected, by way of example and not limitation, via suitable camera and image analysis systems incorporated into the vehicle 100, via lidar/radar systems incorporated into the vehicle 100, or using any other suitable object detection techniques known in the art. The braking distribution condition data 212 includes data indicating the presence of a braking distribution condition so as to, for example, trigger execution of the brake torque distribution functions described herein.

The weight distribution calculation module 202 is configured to obtain the braking distribution condition data 212, reflecting the existence of a braking distribution condition. In response, the weight distribution calculation module 202 is configured to calculate a weight distribution for the vehicle 100 based on longitudinal acceleration data 214 and lateral acceleration data 216 associated with the vehicle 100 to provide calculated weight distribution data 218. As discussed above with regard to FIG. 1, the longitudinal acceleration data 214 and lateral acceleration data 216 may be obtained from the longitudinal acceleration sensor 102 and the lateral acceleration sensor 104, respectively. The calculated weight distribution data 218 may indicate the weight distribution of the vehicle 100 on a per-axis or per-wheel basis. That is, in one example, the calculated weight distribution data 218 may indicate the proportion of the vehicle's total weight being supported by the front axle and the proportion of the vehicle's total weight being supported by the rear axle. In other examples, the calculated weight distribution data 218 may, additionally or alternatively, indicate the proportion of the vehicle's total weight being supported by each wheel of the vehicle 100.

The brake torque limit calculation module 204 is configured to obtain the calculated weight distribution data 218 and perform further processing based thereon. Specifically, the brake torque limit calculation module 204 is configured to calculate a brake torque limit for each of the brakes of the vehicle 100 based the calculated weight distribution data 218 to provide calculated brake torque limits data 220. The calculated brake torques limit data 220 indicates a maximum amount of brake torque that may be applied to a given wheel without the wheel, for example, locking up and/or skidding. This is based on an understanding that the amount of brake torque that may be applied to a given wheel—without the wheel locking or skidding—is a function of the amount of vehicle weight that the wheel is bearing at a given time.

The target brake torque calculation module 206 is configured to obtain the calculated brake torques limit data 220 from the brake torque limit calculation module 204. The target brake torque calculation module 206 is further configured to calculate a target brake torque for each of the brakes of the vehicle 100 based on, at least, driver-demanded brake torque data 222 to provide target brake torque data (not shown). The driver-demanded brake torque data 222 may reflect the amount of brake torque that an operator of the vehicle 100 wishes to apply based on, for example, readings obtained from the stroke sensor 108 (indicating, for example, how far the brake pedal 106 has traveled from its baseline position and/or how much pressure the operator has applied on the brake pedal 106).

The target brake torque calculation module 206 is further configured to compare the calculated brake torque limits data 220 with corresponding target brake torque data. In response to determining that a target brake torque associated with a given brake exceeds a brake torque limit associated with the given brake, the target brake torque calculation module 206 is configured to adjust a brake torque applied to the given brake to provide adjusted brake torque data 226. As noted above, the adjusted brake torque data 226 may include one or more signals configured to adjust an amount of force applied by the brake calipers of the vehicle 100 on the wheels of the vehicle 100. According to some examples, the adjusted brake torque for a given brake is less than or equal to the brake torque limit associated with the given brake. Furthermore, according to some examples, the target brake torque calculation module 206 is further configured to obtain the measured wheel speed data 224 (e.g., from the wheel speed sensors 110). According to this example, the target brake torque calculation module 206 is configured to calculate the target brake torque for each of the brakes of the vehicle 100 based on the measured wheel speed data 224.

The estimated vehicle speed calculation module 208 is configured to obtain the measured wheel speed data 224 and perform further processing based thereon. Specifically, the estimated vehicle speed calculation module 208 is configured to calculate an estimated vehicle speed based on the measured wheel speed data 224 to provide estimated vehicle speed data 228. According to one example, the target brake torque calculation module 206 is configured to calculate the target brake torque for each of the brakes of the vehicle 100, additionally, based on the estimated vehicle speed data 228.

The ABS detection module 230 is configured to detect if an ABS of the vehicle 100 is active to provide ABS activity data 232 (indicating whether the ABS is active or not).

According to some examples, the target brake torque calculation module 206 may obtain the ABS activity data 232 and use it to perform further processing. Specifically, the target brake torque calculation module 206 is configured to make certain determinations and/or re-adjust the brake torque provided to the brakes of the vehicle 100 based on the ABS activity data 232. For example, according to one implementation, the target brake torque calculation module 206 is configured to determine whether (i) the adjusted brake torque (as indicated by the adjusted brake torque data 226) meets the driver-demanded brake torque (as indicated by the driver-demanded brake torque data 222) and (ii) wheels of the vehicle 100 maintain stability for a predetermined period of time, in response to the ABS detection module 230 detecting that the ABS of the vehicle 100 is not active (as indicated by the ABS activity data 232). Further still, according to some examples, the target brake torque calculation module 206 is further configured to re-adjust the brake torque applied to one or more brakes (to provide new adjusted brake torque data 234) in response to determining that either (i) the adjusted brake torque (as indicated by the adjusted brake torque data 226) does not meet the driver-demanded brake torque (as indicated by the driver-demanded brake torque data 222) or (ii) the wheels of the vehicle 100 do not maintain stability for the predetermined period of time.

Figure 3:
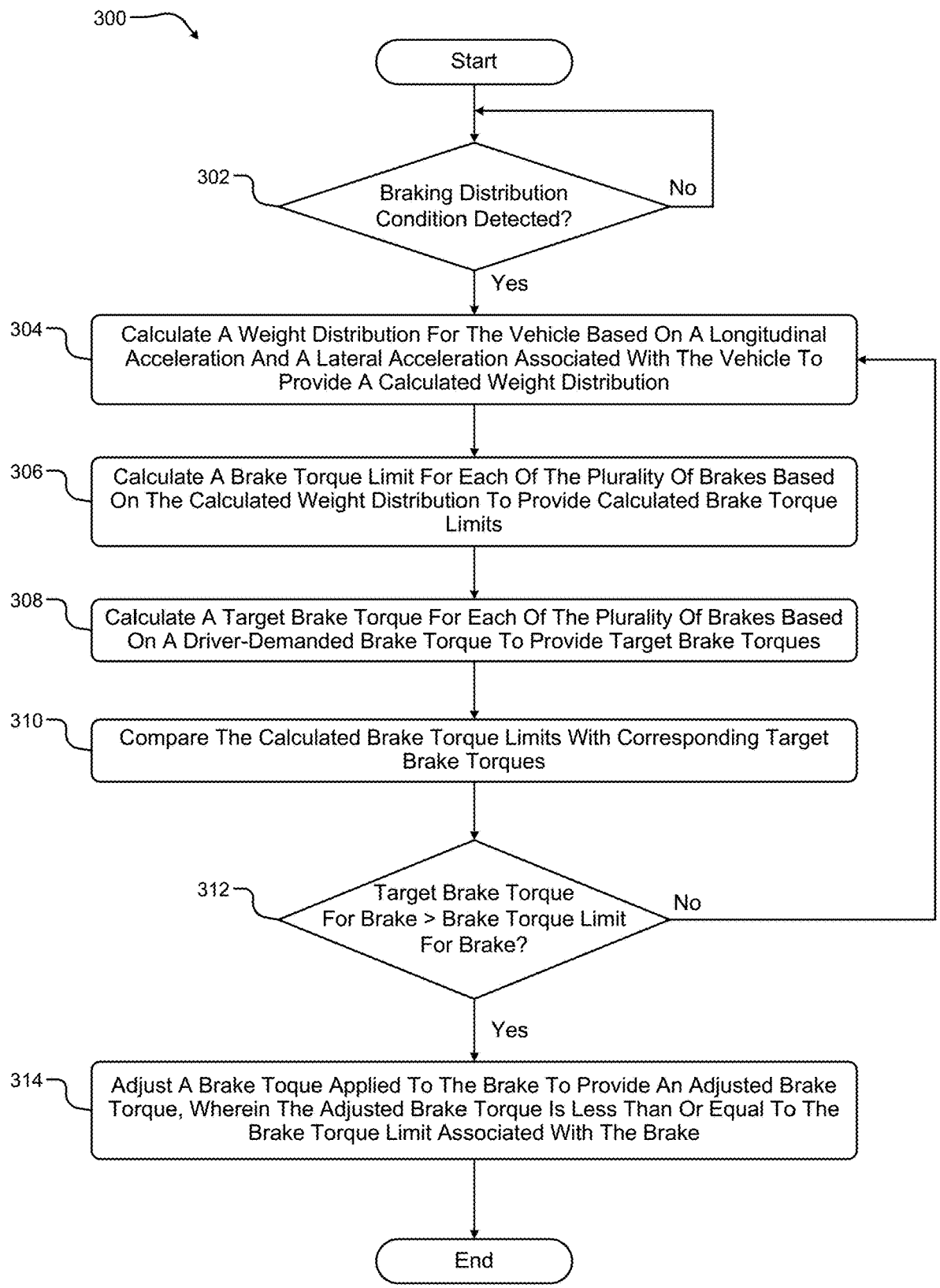
FIG. 3 is a flowchart illustrating a method for dynamically distributing brake torque among a plurality of brakes in accordance with one example of the present disclosure.

FIG. 3 is a flowchart illustrating a method 300 for dynamically distributing brake torque among a plurality of brakes of a vehicle in accordance with one example of the present disclosure. The method 300 begins at 302 where a determination is made as to whether a braking distribution condition has been detected. If not, the method returns to the start. However, if it is determined that a braking distribution condition has been detected, the method 300 proceeds to 304 where a weight distribution is calculated for the vehicle based on a longitudinal acceleration and a lateral acceleration associated with the vehicle to provide a calculated weight distribution. At 306, a brake torque limit is calculated for each of the plurality of brakes based on the calculated weight distribution to provide calculated brake torque limits. At 308, a target brake torque is calculated for each of the plurality of brakes based on a driver-demanded brake torque to provide target brake torques. At 310, the calculated brake torque limits are compared with corresponding target brake torques. At 312, a determination is made as to whether the target brake torque for a given brake exceeds the brake torque limit for the given brake. If not, the method 300 reverts back to 304. If, however, the target brake torque for a given brake exceeds the brake torque limit for the given brake, the method 300 proceeds to 314 where a brake torque applied to the given brake is adjusted. The adjusted brake torque may be less than or equal to the brake torque limit associated with the given break. Following 314, the method 300 concludes.

Figure 4:
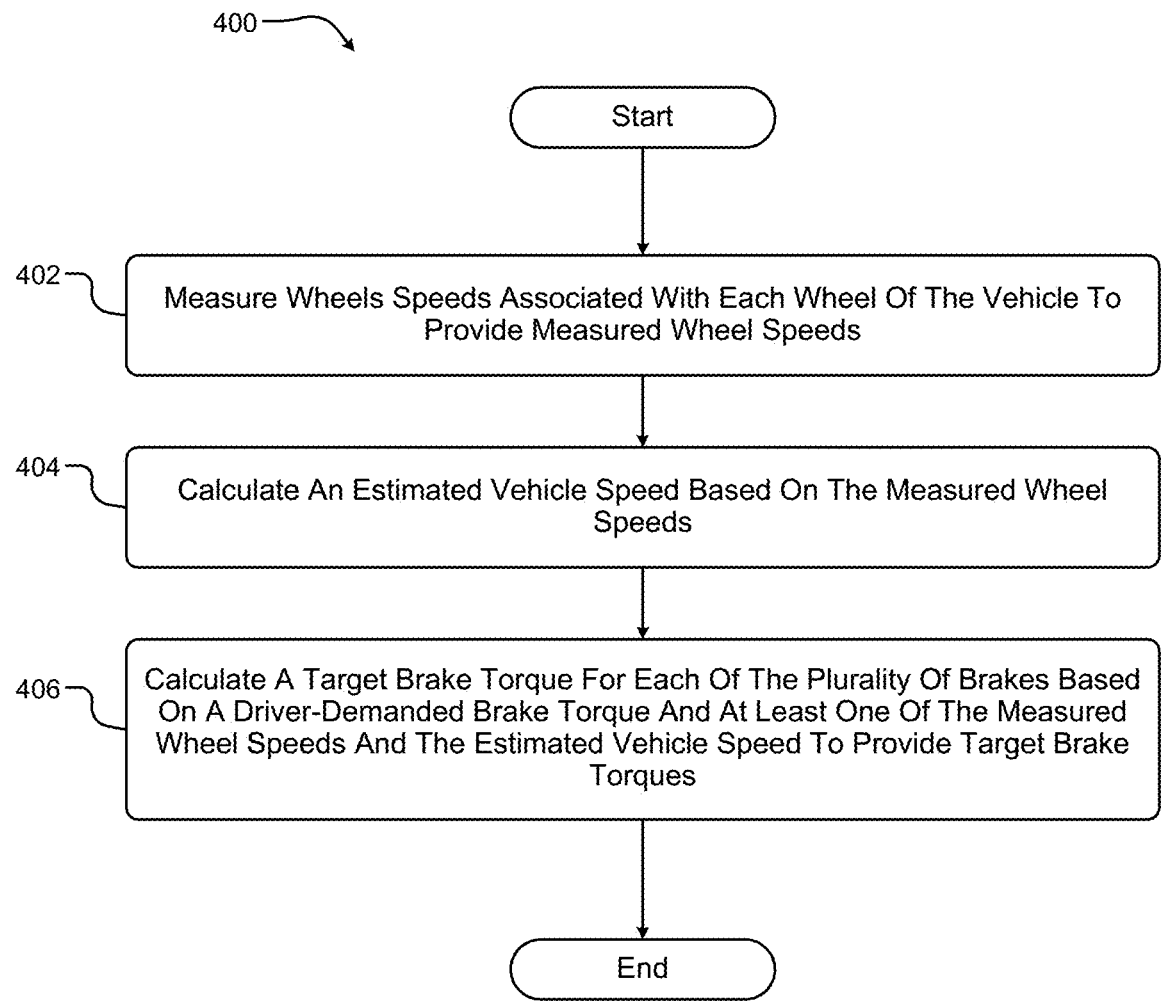
FIG. 4 is a flowchart illustrating a method for calculating a target brake torque for each brake of the vehicle as part of a method for dynamically distributing brake torque among a plurality of brakes in accordance with one example of the present disclosure.

Referring now to FIG. 4, a flowchart illustrating a method 400 for calculating a target brake torque for each brake of the vehicle as part of a method for dynamically distributing brake torque among a plurality of brakes is provided. The method 400 begins at 402 where wheel speeds associated with each wheel of the vehicle are measure to provide measured wheel speeds. At 404, an estimated vehicle speed is calculated based on the measured wheel speeds. Finally, at 406, a target brake torque is calculated for each of the plurality of brakes of the vehicle based on a driver-demanded brake torque and at least one of (i) the measured wheel speeds and/or (ii) the estimated vehicle speed, to provide target brake torques. Following 406, the method 400 concludes.

Figure 5:
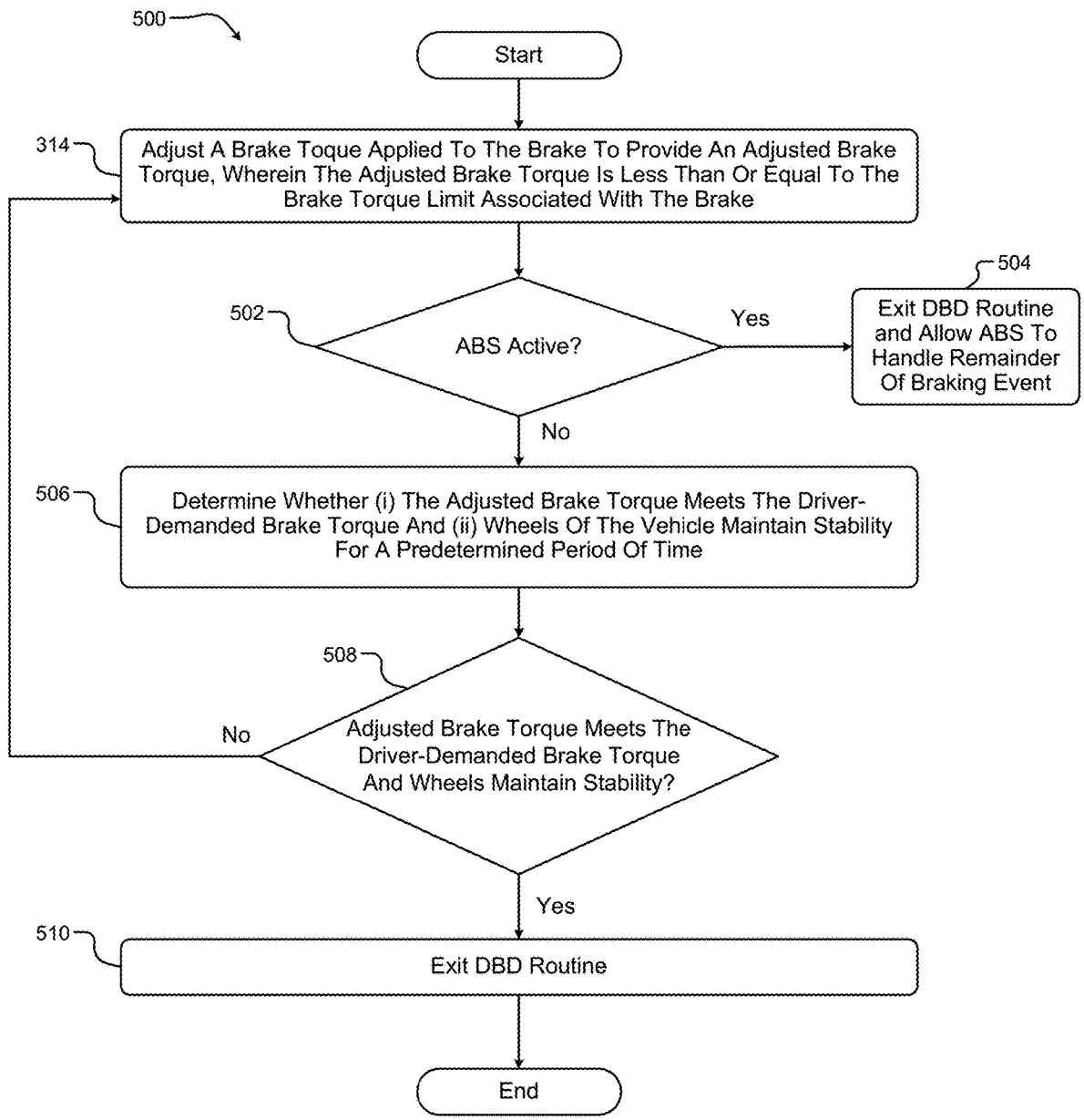
FIG. 5 is a flowchart illustrating a method for determining whether to hand braking control over to an ABS of a vehicle as part of a method for dynamically distributing brake torque among a plurality of brakes in accordance with one example of the present disclosure.

Referring now to FIG. 5, a flowchart illustrating a method 500 for determining whether to hand braking control over to an ABS of a vehicle as part of a method for dynamically distributing brake torque among a plurality of brakes is provided. The method 500 starts at 314, which is the same as step 314 described above with regard to FIG. 3. At 502, a determination is made as to whether the ABS of the vehicle is active. If so, the method 500 proceeds to 504 where the DBD routine is exited and ABS is allowed to handle the remainder of the braking event. If, however, the ABS is not active, the method 500 proceeds to 506 where a determination is made as to whether (i) the adjusted brake torque meets the driver-demanded brake torque and (ii) wheels of the vehicle maintain stability for a predetermined period of time. If the adjusted brake torque does not meet the driver-demanded brake torque or the wheels do not maintain stability for the predetermined period of time, the method 500 reverts to 314 and the brake torque is adjusted (or, re-adjusted as the case may be). If, however, the adjusted brake torque meets the driver-demanded brake torque and the wheels of the vehicle maintain stability for the predetermined period of time, the method 500 proceeds to 510 where the DBD routine is exited. Following 510, the method 500 concludes.

Among other advantages, the systems and methods for dynamically distributing brake torque among a plurality of brakes of a vehicle provided herein retain the benefits of previous brake force distribution functions (e.g., EBD), while also predicting the dynamics of weight transfer to the front and optimizing the front brake pressure throughout the dynamic period.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for dynamically distributing brake torque among a plurality of brakes of a vehicle, the method comprising: detecting a braking distribution condition; in response to detecting the braking distribution condition, calculating a weight distribution for the vehicle based on a longitudinal acceleration and a lateral acceleration associated with the vehicle to provide a calculated weight distribution; calculating a brake torque limit for each of the plurality of brakes based on the calculated weight distribution to provide calculated brake torque limits; calculating a target brake torque for each of the plurality of brakes based on a driver-demanded brake torque to provide target brake torques; comparing the calculated brake torque limits with corresponding target brake torques; and in response to determining that a target brake torque associated with a given brake exceeds a brake torque limit associated with the given brake, adjusting a brake torque applied to the given brake to provide an adjusted brake torque, wherein the adjusted brake torque is less than or equal to the brake torque limit associated with the given brake; detecting if an antilock braking system (ABS) of the vehicle is active; and in response to detecting that the ABS of the vehicle is not active, determining whether (i) the adjusted brake torque meets the driver-demanded brake torque and (ii) wheels of the vehicle maintain stability for a predetermined period of time.

2. The method of claim 1, further comprising:
   measuring wheels speeds associated with each wheel of the vehicle to provide measured wheel speeds.

3. The method of claim 2, wherein calculating the target brake torque for each of the plurality of brakes is further based on the measured wheel speeds.

4. The method of claim 2, further comprising:
   calculating an estimated vehicle speed based on the measured wheel speeds.

5. The method of claim 4, wherein calculating the target brake torque for each of the plurality of brakes is further based on the estimated vehicle speed.

6. The method of claim 1, wherein detecting a braking distribution condition comprises detecting a braking event.

7. The method of claim 6, wherein detecting the braking event is based on at least one of:
   detecting movement of a brake pedal of the vehicle; and
   detecting a presence of an object in the vehicle's path.

8. The method of claim 1, further comprising:
   in response to determining that either (i) the adjusted brake torque does not meet the driver-demanded brake torque or (ii) the wheels do not maintain stability for the predetermined period of time, re-adjusting the brake torque applied to the given brake to provide a new adjusted brake torque.

9. A system for dynamically distributing brake torque, comprising: a plurality of brakes of a vehicle; and,
   an electronic control unit including a processor configured to function as: a brake distribution detection module configured to detect a braking distribution condition; a weight distribution calculation module configured to calculate a weight distribution for the vehicle based on a longitudinal acceleration and a lateral acceleration associated with the vehicle to provide a calculated weight distribution in response to detecting the braking distribution condition; a brake torque limit calculation module configured to calculate a brake torque limit for each of the plurality of brakes based on the calculated weight distribution to provide calculated brake torque limits; an antilock braking system (ABS) detection module configured to detect if an ABS of the vehicle is active; and a target brake torque calculation module configured to: calculate a target brake torque for each of the plurality of brakes based on a driver-demanded brake torque to provide target brake torques; compare the calculated brake torque limits with corresponding target brake torques; in response to determining that a target brake torque associated with a given brake exceeds a brake torque limit associated with the given brake, adjust a brake torque applied to the given brake to provide an adjusted brake torque, wherein the adjusted brake torque is less than or equal to the brake torque limit associated with the given brake; and determine whether (i) the adjusted brake torque meets the driver-demanded brake torque and (ii) wheels of the vehicle maintain stability for a predetermined period of time in response to the ABS detection module detecting that the ABS of the vehicle is not active.

10. The system of claim 9, further comprising:
    one or more wheel speed sensors configured to measure wheels speeds associated with each wheel of the vehicle to provide measured wheel speeds.

11. The system of claim 10, wherein the target brake torque calculation module is further configured to calculate the target brake torque for each of the plurality of brakes based on the measured wheel speeds.

12. The system of claim 10, wherein the processor is further configured to function as an estimated vehicle speed calculation module configured to calculate an estimated vehicle speed based on the measured wheel speeds.

13. The system of claim 12, wherein the target brake torque calculation module is further configured to calculate the target brake torque for each of the plurality of brakes based on the estimated vehicle speed.

14. The system of claim 9, wherein the brake distribution detection module is configured to detect the braking distribution condition by detecting a braking event.

15. The system of claim 14, wherein the brake distribution detection module is configured to detect the braking event by performing at least one of:
    detecting movement of a brake pedal of the vehicle; and
    detecting a presence of an object in the vehicle's path.

16. The system of claim 9, wherein the target brake torque calculation module is further configured to re-adjust the brake torque applied to the given brake to provide a new adjusted brake torque in response to determining that either (i) the adjusted brake torque does not meet the driver-demanded brake torque or (ii) the wheels do not maintain stability for the predetermined period of time.

* * * * *